UNITED STATES PATENT OFFICE.

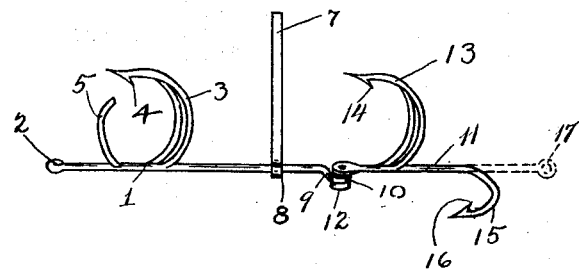
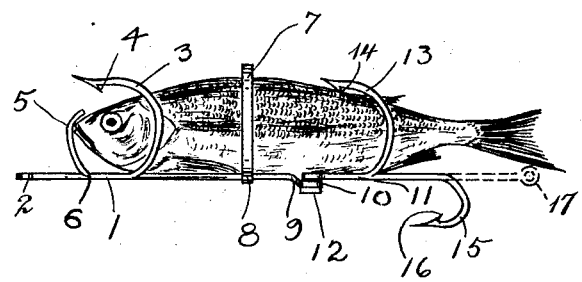
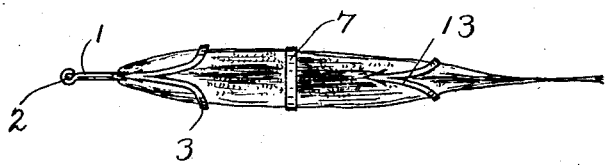

RUDOLPH A. ANSCHUTZ, OF SPOKANE, WASHINGTON.

LIVE-BAIT RETAINER.

1,105,172.  Specification of Letters Patent.  Patented July 28, 1914.

Application filed September 13, 1913. Serial No. 789,610.

*To all whom it may concern:*

Be it known that I, RUDOLPH A. ANSCHUTZ, a citizen of the United States, residing at Spokane, in the county of Spokane and State of Washington, have invented certain new and useful Improvements in Live-Bait Retainers, of which the following is a specification.

This invention relates to improvements in live bait retainers for attachment to the end of a fish line when trolling or casting for bass, salmon or fish of similar habits and propensities.

One of the objects of this invention is to provide a cage or retainer which will securely hold the bait or minnow and which will permit of natural bodily flexure thereof in simulation of swimming movement, as long as the bait is alive.

A further object is to provide a cage structure with head and tail retaining portions and a flexible element adapted to be bent about the central portion of a minnow to secure the same in place in such a manner as not to interfere with free flexure of its body.

Further objects and novel features will be more fully described in connection with the accompanying drawing and will be more particularly pointed out in and by the appended claims.

In the drawing:—Figure 1, is a perspective view of one form of the device of my invention before the bait has been inserted. Fig. 2, is a side elevation with a minnow inserted. Fig. 3, is a top plan view of the device as shown in Fig. 2.

Like characters of reference designate like parts throughout the different figures of the drawings.

The device of my invention is shown designed for use in casting or trolling for fish whose habits are to bite or swallow minnows tail first instead of head first but the device can readily be adapted for use in casting for fish which take the bait head first.

As shown, 1 designates a head or front shank portion which is provided with an eye 2, for attachment to the end of a fish line, not shown. A looped or split retaining device 3, is formed on or attached to said shank for grasping the bait laterally of the head portion thereof and the device terminates in a beard 4, which projects rearwardly. A stop 5, for engaging the mouth of the minnow, may comprise a wire projecting upwardly from the shank and secured thereto by being wound about the same as indicated at 6. To engage the minnow about the larger or central portion of its body I provide means which may be in the form of a bendable element or strip 7, secured to the shank 1, by having its end wound thereabout, as indicated at 8. The strip 7 may consist of any pliable material such as soft copper which is strong enough to resist deforming pressure as a minnow could exert but which could easily be bent into shape with the fingers. The terminal of the shank 1, is preferably offset to form a shoulder 9, and the offset end is shaped to form an eye 10. The rear or tail engaging portion may comprise a shank 11, having its forward end pivotally connected with the front or head portion by a set screw 12. Said rear shank portion is provided with a looped or split retaining device 13, for grasping the minnow laterally of the tail portion and said device terminates in a beard 14, which projects rearwardly like the beard 4. A fish-hook 15 depends from the shank 11 in a manner to dispose its beard 16, corresponding to beards 4 and 14.

When it is desired to adapt the device for fish which take the bait head first, a line attaching eye 17, as indicated in dotted lines, may be provided on the shank 11, which will then become the front shank portion.

When the minnow is to be inserted, the head is first projected into the split front retaining device until its nose engages the stop 5. The natural flexibility of the minnow, together with the flexibility provided by the pivotal connection, will permit the tail to be projected rearwardly through the rear-retaining device whereupon the smaller ends of the minnow will be embraced by retaining devices at longitudinally spaced points opposite its larger central portion thereby precluding all possibility of escape of the minnow from the cage although permitting natural flexure of its body in a manner simulative of swimming movement. The strip 7 will now be bent about the larger central portion of the body to more firmly resist endwise withdrawing movement, and as the strip 7 is disposed between the head and tail retaining devices and at one side of the pivotal connection thereof, it will not interfere with relatively free movement of the minnow in simulation of swimming movement.

It will be seen that the minnow is not injured when inserted into the cage so that its life will be materially prolonged and therefore it may be used successively, or many times, as bait, as long as life remains. Even in case the minnow should be lifeless, its movement through the water under a swift casting movement would cause a very perceptible movement which would attract the attention and invite pursuit by the fish. The hooks lie along the body of the minnow so as to be in a position to embed in the mouth of a fish attempting to swallow the bait.

It is believed that the advantages and utility of my invention will be clear from the foregoing, and while I have shown and described one specific form of my invention, it will be understood that I do not wish to be limited thereto except for such limitations as the claims may import.

I claim:—

1. A fish-hook structure comprising in combination, a front portion adapted for connection with a line and provided with a head retaining device for the live bait and an element adapted to be bent about the body of the bait centrally thereof, and a rear portion pivotally connected with the front portion and provided with a tail retaining device and a fish-hook, substantially as described.

2. A live bait cage for minnows comprising in combination, shank portions disposed along the belly of the minnow and pivotally connected with each other, one shank portion having a loop for embracing the minnow near its head and terminating in a hook above its head and provided on its free end with means for attachment to a line, the other portion having a loop embracing the minnow near its tail and terminating in a hook above its tail and the free end of said last named portion terminating in a fish-hook, substantially as described.

In testimony whereof I affix my signature in presence of two witnesses.

RUDOLPH A. ANSCHUTZ.

Witnesses:
ROBERT W. TURNER,
HAROLD SCANTLEBURY.

Copies of this patent may be obtained for five cents each, by addressing the "Commissioner of Patents, Washington, D. C."